United States Patent
Mola

(10) Patent No.: US 10,860,485 B2
(45) Date of Patent: Dec. 8, 2020

(54) LEVERAGING EXISTING LOGIC PATHS DURING BIT-ACCURATE PROCESSOR TRACING

(71) Applicant: Microsoft Technology Licensing, LLC, Redmond, WA (US)

(72) Inventor: Jordi Mola, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 16/180,753

(22) Filed: Nov. 5, 2018

(65) Prior Publication Data

US 2020/0142769 A1    May 7, 2020

(51) Int. Cl.
  *G06F 11/00*    (2006.01)
  *G06F 12/0815*    (2016.01)
  *G06F 11/36*    (2006.01)

(52) U.S. Cl.
  CPC ...... *G06F 12/0815* (2013.01); *G06F 11/3636* (2013.01); *G06F 2212/1032* (2013.01); *G06F 2212/608* (2013.01)

(58) Field of Classification Search
  CPC .............. G06F 11/3636; G06F 11/362; G06F 12/0815; G06F 12/084; G06F 12/0842; G06F 2212/608; G06F 2212/1032
  See application file for complete search history.

(56) References Cited

U.S. PATENT DOCUMENTS

| | | | | |
|---|---|---|---|---|
| 5,666,514 | A * | 9/1997 | Cheriton | G06F 11/1407 711/141 |
| 10,031,833 | B2 * | 7/2018 | Mola | G06F 11/00 |
| 2006/0112310 | A1 * | 5/2006 | McHale | G06F 11/348 714/15 |
| 2010/0250856 | A1 * | 9/2010 | Owen | G06F 12/084 711/128 |

(Continued)

OTHER PUBLICATIONS

Narayanasamy et al, BugNet: Continuously Recording Program Execution for Deterministic Replay Debugging, 2005, IEEE (Year: 2005).*

(Continued)

*Primary Examiner* — Marc Duncan
(74) *Attorney, Agent, or Firm* — Workman Nydegger

(57) ABSTRACT

The disclosure relates to embodiments, implemented at least partially in microcode, that use cache misses to trigger logging to a processor trace. One embodiment relies on tracking bits in a processor cache. During a transition from a non-logged context to a logged context, this embodiment invalidates or evicts cache lines whose tracking bits are not set. When logging, this first embodiment logs during cache misses, and sets tracking bits for logged cache lines. Another embodiment relies on way-locking. This second embodiment assigns first ways to a logged entity and second ways to a non-logged entity. The second embodiment ensures the logged entity cannot read cache lines from the second logging ways by flushing the second way during transitions from non-logging to logging, ensures the logged entity cannot read non-logged cache lines from the first ways, and logs based on cache misses into the first ways while executing a logged context.

20 Claims, 5 Drawing Sheets

(56) References Cited

U.S. PATENT DOCUMENTS

2013/0067284 A1\* 3/2013 Berg .................. G06F 11/3636
714/37
2017/0286111 A1\* 10/2017 Pereira ............... G06F 12/0875
2018/0113789 A1 4/2018 Mola

OTHER PUBLICATIONS

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

Narayanasamy, et al., "Recording Shared Memory Dependencies Using Strata", In Proceeding of the 12th International Conference on Architectural Support for Programming Languages and Operating Systems, Oct. 20, 2006, pp. 229-240.

"International Search Report and Written Opinion Issued in PCT Application No. PCT/US19/058420", dated Feb. 7, 2020, 15 Pages.

\* cited by examiner

LEVERAGING EXISTING LOGIC PATHS DURING BIT-ACCURATE PROCESSOR TRACING

BACKGROUND

When writing code during the development of software applications, developers commonly spend a significant amount of time "debugging" the code to find runtime errors in the code. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging, in which execution of one or more of a program's threads are recorded/traced by tracing software and/or hardware into one or more trace files. Using some tracing techniques, these trace file(s) contain a "bit-accurate" trace of each traced thread's execution, which can be then be used to replay each traced thread's execution later for forward and backward analysis. Using bit-accurate traces, each traced thread's prior execution can be reproduced down to the granularity of its individual machine code instructions. Using these bit-accurate traces, time travel debuggers can enable a developer to set forward breakpoints (like conventional debuggers) as well as reverse breakpoints during replay of traced threads.

Some forms of hardware-based trace recording records bit-accurate traces based, in part, on recording influxes to a microprocessor's cache during execution of each traced thread's machine code instructions by the processor. These recorded cache influxes enable a time travel debugger to later reproduce any memory values that were read by these machine code instructions during replay of a traced thread. Support of such hardware-based bit-accurate trace recording is implemented, at least in part, by modifications to the processor itself.

BRIEF SUMMARY

Hardware-based bit-accurate trace recording relies on being able to keep track of which cache line(s) have been logged to a processor trace. This can be implemented, for example, based on adding tracking bits to a processor's cache, based on locking a traced entity (e.g., threads, processor, etc.) to particular "ways" in a set-associative cache, and/or by using a processor's cache coherence protocol ("CCP") to track shared accesses to cache lines by multiple processing units. As will discussed in more detail herein, some implementations of these tracking techniques might be implemented largely in hardware digital logic, such as part of a processor's cache logic. These hardware logic modifications are expensive, both in terms of development effort and the additional processor die space they occupy. In addition, these performing logging with these implementations can cause interruptions to execution of a traced entity.

At least some embodiments described herein are directed to implementations of hardware-based bit-accurate trace recording techniques, the logic of which can be implemented entirely (or primarily) in processor microcode (i.e., software), rather than hardware digital logic. Since development and implementation of processor microcode is generally cheaper than development and implementation of hardware digital logic, these implementations can therefore be implemented in more timely and cost-effective manners than hardware digital logic implementations. In addition, these implementations of hardware-based bit-accurate trace recording techniques also enable a processor to do more "expensive" work (e.g., in terms of numbers of processor cycles required) during times that the processor has already been interrupted from execution of traced code, such as during context switches (e.g., during transitions between non-logging and logging modes, during transitions between user mode and kernel mode) and during cache misses. Thus, these implementations add relatively little overhead to already expensive operations such as context switches and cache misses, rather than causing interruptions themselves.

In some embodiments, a computing device uses cache misses to trigger logging to a processor trace. The computing device includes one or more processing units and a cache comprising a plurality of cache lines, each being associated with a tracking bit. Based at least on a transition by the one or more processing units from operating in a non-logged context to operating in a logged context, the computing device invalidates or evicts one or more of the plurality of cache lines whose tracking bits are not set. Based at least on the one or more processing units operating in the logged context, the computing device initiates logging, to the processor trace, one or more cache lines that store the influxes of one or more cache misses that occur while the one or more processing units operate in the logged context and sets the tracking bit for each logged cache line.

In other embodiments, a computing device uses cache misses to trigger logging to a processor trace. The computing device includes one or more processing units and a cache comprising a plurality of cache lines, the plurality of cache lines being divided into a plurality of sets, each set having a plurality of ways. The computing device assigns one or more first logging ways of the plurality of ways to a logged entity and assigns one or more second non-logging ways of the plurality of ways to a non-logged entity. The computing device also ensures that the logged entity cannot read non-logged cache lines from the one or more second ways. Based at least on a transition from executing the non-logged entity to executing the logged entity, the computing device evicts or invalidates any cache lines in the one or more first ways that have an 'exclusive' CCP state. Based at least on the one or more processing units executing the logged entity, the computing device initiates logging, to the processor trace, any cache lines in the one or more first ways that store the influxes of any cache misses that occur while the one or more processing units execute the logged entity.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein are directed to implementations of hardware-based bit-accurate trace recording techniques, the logic of which can be implemented entirely (or primarily) in processor microcode (i.e., software), rather than hardware digital logic. Since development and implementation of processor microcode is generally cheaper than development and implementation of hardware digital logic, these implementations can therefore be implemented in more timely and cost-effective manners than hardware digital logic implementations. In addition, these implementations of hardware-based bit-accurate trace recording techniques also enable a processor to do more "expensive" work (e.g., in terms of numbers of processor cycles required) during times that the processor has already been interrupted from execution of traced code, such as during context switches (e.g., during transitions between non-logging and logging modes, during transitions between user mode and kernel mode) and during cache misses. Thus, these implementations add relatively little overhead to already expensive operations such as context switches and cache misses, rather than causing interruptions themselves.

Figure 1:
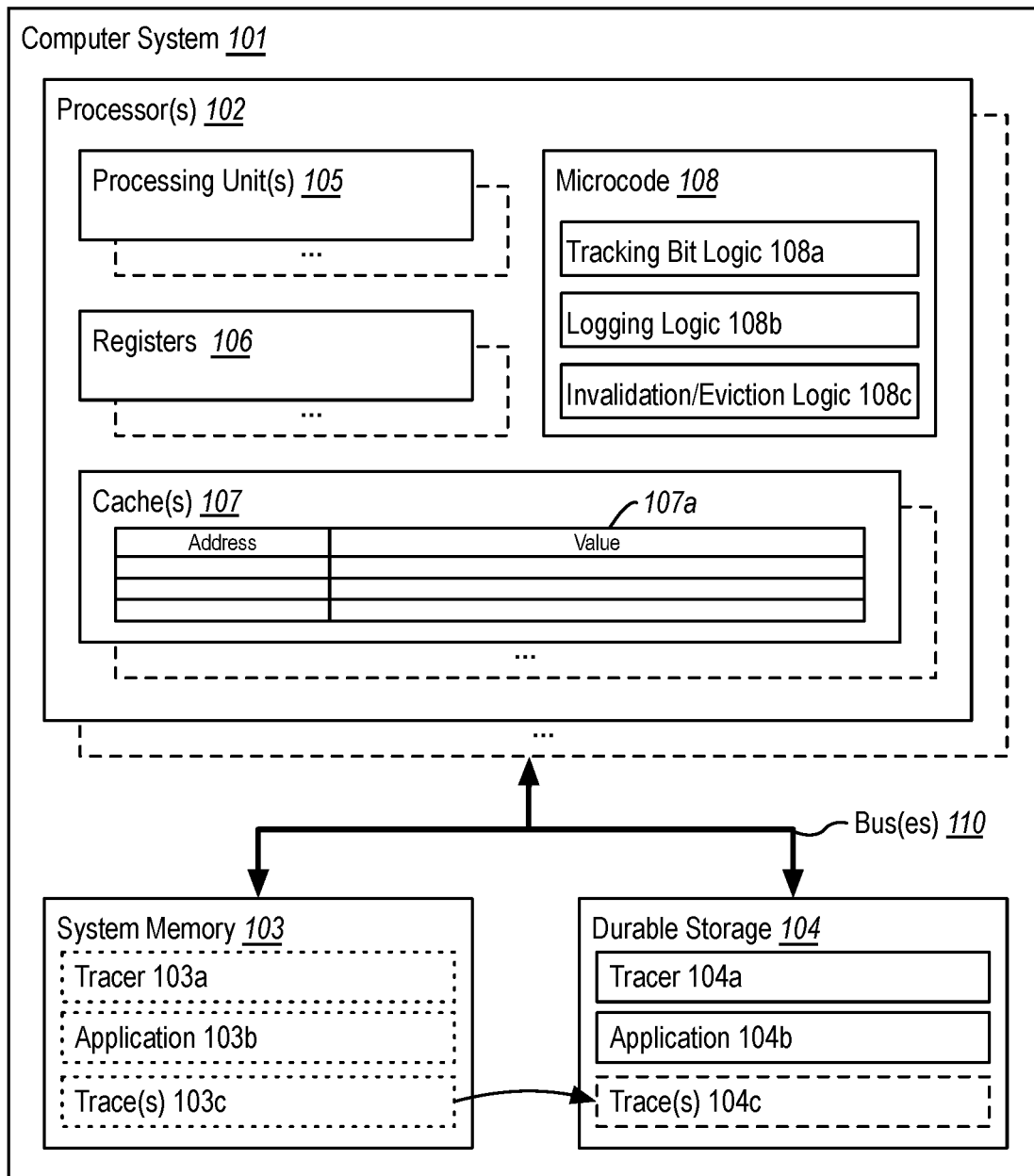
FIG. 1 illustrates an example computing environment that facilitates implementations of recording "bit-accurate" traces of code execution using caches, the logic of which is implemented entirely (or primarily) in processor microcode.

To the accomplishment of the foregoing, FIG. 1 illustrates an example computing environment 100 that facilitates implementations of recording "bit-accurate" traces of code execution using caches, the logic of which can be implemented entirely (or primarily) in processor microcode. As depicted, embodiments may comprise or utilize a special-purpose or general-purpose computer system 101 that includes computer hardware, such as, for example, one or more processor(s) 102, system memory 103, and durable storage 104, which are communicatively coupled using one or more communications buses 110.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the processor(s) 102 to implement the disclosed functionality of the invention. Thus, for example, computer storage devices may include the depicted system memory 103, the depicted durable storage 104, and/or the depicted microcode 108, which can each store computer-executable instructions and/or data structures.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a network interface module (e.g., a "NIC"), and then eventually transferred to the system memory 103 and/or to less volatile computer storage devices (e.g., durable storage 104) at the computer system 101. Thus, it should be understood that computer storage devices can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As illustrated, the durable storage 104 can store computer-executable instructions and/or data structures representing application programs such as, for example, a tracer 104*a* and an application 104*b* (e.g., the application that is the subject of tracing by the tracer 104*a*, which could be a user-mode application and/or an operating system kernel). The tracer 104*a* is usable to record a bit-accurate trace of execution of an application, such as application 104*b*. In some embodiments, the tracer 104*a* is a standalone application, while in other embodiments the tracer 104*a* is integrated into another software component, such as an operating system kernel, a hypervisor, a cloud fabric, etc.

During operation of computer system 101, the processor 102 can cause the tracer 104*a* and the application 104*b* to be loaded into system memory 103 (i.e., shown as tracer 103*a* and application 103*b*). In embodiments, the processor(s) 102 execute machine code instructions of application 103*b* stored in system memory 103, and during execution of those machine code instructions, the tracer 103*a* instructs the processor(s) 102 to record a bit-accurate trace of execution of those instructions. This bit-accurate trace can be recorded based, at least in part, on recording cache influxes to cache(s) 107 caused by execution of those instructions. This trace can be stored in system memory 103 (i.e., shown as trace(s) 103*c*) and, if desired, can also be persisted to the durable storage 104 (i.e., as indicated by the arrow between trace(s) 103*c* and trace(s) 104*c*).

FIG. 1 details some of the components of each processor 102 that can be used to implement the embodiments herein. As shown, each processor 102 can include (among other things) one or more processing units 105 (e.g., processor cores), a plurality of registers 106, one or more cache(s) 107, and microcode 108. In general, each processing unit 105 loads and executes machine code instructions (e.g., of application 103*c*) from the cache(s) 107 (e.g., a "code" portion of the cache(s) 107). During their execution, the machine code instructions can use the registers 106 as temporary storage locations and can read and write to various locations in system memory 103 via the cache(s) 107 (e.g., using a "data" portion of the cache(s) 107). If a processing unit 105 requires data (e.g., code or application runtime data) not already stored in the cache(s) 107, then the processing unit 105 initiates a "cache miss," causing data to be fetched from the system memory 103 and stored in the cache(s) 107—while potentially "evicting" some other data from the cache(s) 107. While operation of the various components of each processor 102 is controlled in large part by hardware digital logic (e.g., implemented using transistors), operation of the various components of each processor 102 can also be controlled, at least in part, using software instructions contained in processor microcode 108.

The registers 106 are hardware-based storage locations that are read from and/or written to by executing machine code instructions. For example, registers 106 are commonly used to store values fetched from the cache(s) 107 for use by machine code instructions, to store the results of executing machine code instructions, and/or to store status or state—such as some of the side-effects of executing machine code instructions (e.g., the sign of a value changing, a value reaching zero, the occurrence of a carry, etc.), a processor cycle count, etc. Thus, some registers 106 may comprise "flags" that are used to signal some state change caused by executing processor instructions. In some embodiments, registers 106 may also include control registers, which are used to control different aspects of processor operation. In most processor implementations, there is a different set of registers devoted to each processing unit 105.

Typically, each cache comprises a plurality of "cache lines," each of which stores a chunk of memory from the backing store. For example, FIG. 1 symbolically illustrates the cache(s) 107 using a table 107*a*, in which each row (i.e., cache line) in the table stores at least an address and a value. The address might refer to a location (e.g., a memory cell) in system memory 103. The address might be a physical address (e.g., the actual physical location in the system memory 103), or address might be a virtual address (e.g., an address that is mapped to the physical address to provide an abstraction). Virtual addresses could be used, for example, to facilitate memory isolation between different processes executing at the processor(s) 102.

When virtual addresses are used, a processor 102 may include a translation lookaside buffer ("TLB") that maintains mappings between physical and virtual memory address. The value of each cache line might initially (i.e., after a cache miss) correspond a value received from that address in system memory 103. The value might then be modified by the processing units 105, and eventually be evicted back to system memory 103. While table 107a shows only three rows, a cache can include a large number of cache lines. For example, a contemporary INTEL processor may contain one or more L1 caches comprising 512 or more cache lines, with each cache line typically being usable to store a 64 byte (512 bit) value in reference to an 8 byte (64 bit) memory address.

Often times, a processor cache is divided into separate levels (also referred to as tiers or layers). For example, the cache(s) 107 could comprise a different L1 cache for each processing unit 105, one or more L2 caches that are each shared by two or more of the processing units 105 and backing their L1 caches, an L3 cache backing multiple L2 caches, etc. When multiple cache levels are used, the processing unit(s) 105 generally interact directly with the lowest level (i.e., L1). In most cases, data flows between the levels (e.g., on a read an L3 cache interacts with the system memory 103 and serves data to an L2 cache, and the L2 cache in turn serves data to the L1 cache). When a processing unit 105 needs to perform a write, the cache(s) 107 coordinate to ensure that those caches that had affected data that was shared among the processing unit(s) 105 don't have it anymore. This coordination is performed using a cache coherence protocol ("CCP"), which is discussed later.

Caches can be inclusive, exclusive, or include both inclusive and exclusive behaviors. For example, in an inclusive cache an L3 cache would store a superset of the data in the L2 caches below it, and the L2 caches store a superset of the L1 caches below them. In exclusive caches, the layers may be disjointed—for example, if data exists in an L3 cache that an L1 cache needs, they may swap information, such as data, address, and the like.

The microcode 108 comprises software logic (i.e., executable instructions) that control operation of the various components of the processor 102, and which generally functions as an interpreter between the internal hardware of the processor and the processor instruction set architecture ("ISA") that is exposed by the processor 102 to executing applications. The microcode 108 may be embodied on read-only and/or read-write on-processor storage, such as ROM, EEPROM, etc.

Embodiments utilize the processor's cache(s) 107 to efficiently record a bit-accurate trace of execution of application 104b. These embodiments are built upon an observation that each processor 102 forms a semi- or quasi-closed system. For example, once portions of data for a thread (i.e., code data and runtime application data) are loaded into the cache(s) 107, the processor 102 can execute this thread by itself—without any input—as a semi- or quasi-closed system for bursts of time. In particular, one or more of the processing units 105 may execute instructions from a code portion of the cache(s) 107, using runtime data stored in a data portion of the cache(s) 107 and using the registers 106.

When a processing unit 105 needs some influx of information (e.g., because an instruction it is executing, will execute, or may execute accesses code or runtime data not already in the cache(s) 107), the processing unit 105 triggers a "cache miss" and that information is brought into the cache(s) 107 from the system memory 103. The processing unit 105 then continues execution using the new information in the cache(s) 107 until new information is again brought into the cache(s) 107 (e.g., due to another cache miss or an un-cached read). In order to create a bit-accurate representation of execution of application 104b, the processor 102 can record data into the trace(s) 103c that is sufficient to reproduce the data that was read by the machine code instructions of application 104b during its execution.

One approach to creating a bit-accurate representation of execution of application 104b is to log to the trace(s) 103c the cache lines that were read by each processing unit 105 as they executed machine code instructions of application 104b. Embodiments of this approach involve an extension to the cache(s) 107 that enables the processor(s) 102 to identify which cache line(s) have been logged (and, potentially, by which processing unit 105).

Figure 2A:
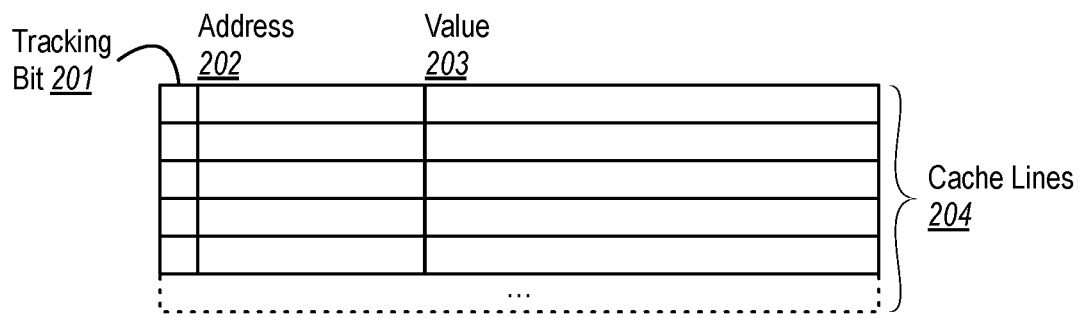
FIG. 2A illustrates an example cache in which each cache line has been extended to include at least one tracking bit.

To illustrate these extensions, FIG. 2A illustrates an example cache 200a, in which each cache line 204 has been extended to include at least one tracking bit 201. Thus, each cache line 204 includes at least one tracking bit 201, a plurality of address bits 202 (i.e., for storing a virtual or physical memory address), and a plurality of value bits 203 (i.e., for storing a memory value). In some implementations, each tracking bit 201 comprises a single bit that functions as a flag (i.e., on or off, set or cleared, etc.) used by the processor 102 to indicate whether or not the value of the cache line has been logged.

Figure 2B:
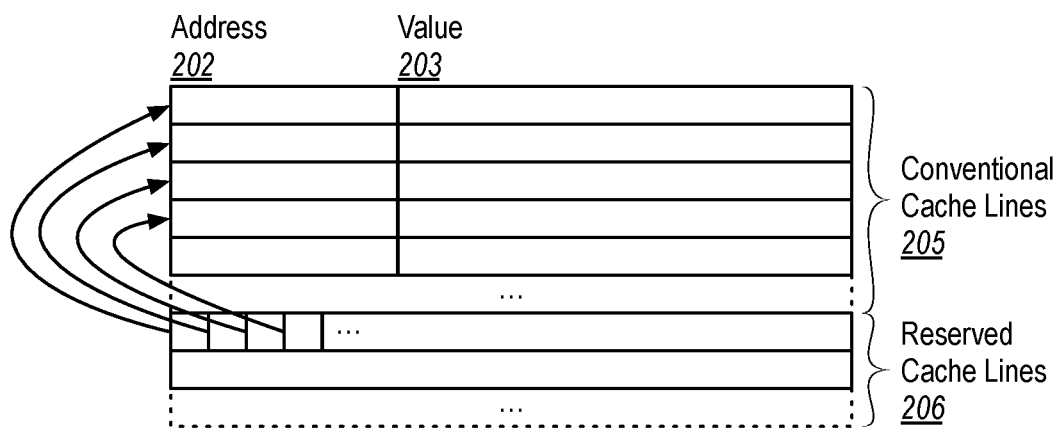
FIG. 2B illustrates an example cache in which reserves one or more cache lines for storing tracking bits.

FIG. 2B illustrates an alternate implementation, which reserves one or more cache lines for storing tracking bits, rather than adding tracking bits to each cache line. In particular, FIG. 2B illustrates an example of a cache 200b that includes a plurality of conventional cache lines 205 (i.e., that each includes a plurality of address bits 202 and a plurality of value bits 203), as well as one or more reserved cache line(s) 206 for storing tracking bits that apply to the conventional cache lines 205. For example, as indicated by the arrows, different sets of one or more tracking bits in each reserved cache line 206 could each correspond to a different conventional cache line 205.

Some implementations might extend the cache(s) 107 with tracking bits (either per cache line or as reserved cache lines), and then extend hardware logic associated with the cache(s) 107 such that the cache(s) 107 use these tracking bits in a manner that relies on (i) setting a tracking bit for a given cache line whenever a logged thread reads its value, and (ii) clearing the tracking bit for the cache line when the value of the cache line is no longer known to be logged. In these implementations, the cache(s) 107 might initiate logging of a particular cache line to the trace(s) 103c based on the tracking bit for the cache line indicating that the cache line has transitioned from being non-logged to being logged (e.g., since the tracking bit was changed from a being cleared (e.g., 0) to being set (e.g., 1)).

However, using tracking bits in this manner might mean that extending the logic associated with the cache(s) 107 involves substantial changes to hardware digital logic associated with the cache(s) 107. For example, this hardware digital logic might include logic that causes the cache(s) 107 to detect when tracking bits needs to be set or cleared, logic causes the cache(s) 107 to carry out the setting and clearing of the tracking bits, logic that causes the cache(s) 107 to detect when a tracking bit's value has changed from being cleared to being set, logic that causes the cache(s) 107 to initiate logging of cache lines to the trace(s) 103c when a tracking bit's value has changed from being cleared to being set, and the like. Taken together, this hardware digital logic might be cost-prohibitive to include in processor design (e.g., in terms of development cost, in terms of processor die space, etc.), leading to reduced adoption of tracking bit-based processor tracing.

In order to overcome these challenges, the inventor has developed alternative uses of tracking bits that enable logic associated with their use to be implemented entirely (or at least primarily) in microcode 108, rather than in hardware digital logic. In particular, these embodiments ensure that management of the tracking bits, and performing the logging associated therewith, can be performed at times during which the processor 102 is already performing operations that are either controlled directly by execution of microcode 108 or that are at least associated closely with execution of microcode 108. For example, the inventor has observed that the performance of processor context switches (e.g., between user mode and kernel mode) are often controlled directly by execution of microcode 108, and that performance of cache misses is either controlled directly by execution of microcode 108 or is at least associated closely with execution of microcode 108 (e.g., as part of a CCP).

In general, the inventor has devised uses of tracking bits that involve initiating logging to the trace(s) 103c in connection with cache misses, rather than in connection with a tracking bit's value changing (e.g., from being cleared to being set). This means that logic (e.g., tracking bit logic 108a) that reads and manages tracking bits and/or logic (e.g., logging logic 108b) that carries out logging on cache misses can be added to microcode execution paths that may already be associated with cache misses (e.g., as part of a CCP). This also means that the work of reading and managing tracking bits and carrying out logging happens in connection with already computationally expensive cache misses, rather than during normal execution of a logged thread.

In order to enable logging to be initiated in connection with cache misses (rather than in connection with a tracking bit's value being changed from being cleared to being set), embodiments also operate to leverage existing processor context switches to invalidate or evict cache lines that have not been logged. This means that logic (e.g., invalidation/eviction logic 108c) that performs these invalidations/evictions can be added to microcode execution paths that are already associated with context switches. This also means that the work of performing the invalidations/evictions happens in connection with already computationally expensive context switches, rather than during normal execution of a logged thread.

More particularly, the invalidation/eviction logic 108c performs cache line invalidations and/or evictions during context switches associated with transitions from non-logging to logging, ensuring that after the transition to logging relevant portion(s) of the cache(s) 107 contain only cache lines that have already been logged to the trace(s) 103c. For example, embodiments might invalidate or evict any cache lines whose tracking bits are not set (i.e., cache lines that are not already logged) during a transition from executing a first non-logged thread (e.g., a kernel mode thread) to executing a second logged thread (e.g., a user mode thread). In another example, embodiments might invalidate or evict non-logged cache lines during a transition from executing a thread (user mode or kernel mode) in a non-logging mode to executing the thread in a logging mode. These invalidations/evictions ensure that, when executing code after the transition to logging, it is sufficient to log cache influxes only when cache misses occur.

Based on performing these invalidations/evictions during transitions from non-logging to logging, use of tracking bits can proceed as follows. When executing code while logging, the logging logic 108b can log any cache line(s) associated with cache miss(es) that occur to the trace file(s) 103c, and the tracking bit logic 108a can mark the logged cache line(s) as logged (e.g., by setting their logging bits). When executing code while not logging, on the other hand, the tracking bit logic 108a can mark any cache line(s) associated with cache miss(es) that occur while not logging as not logged (e.g., by clearing their logging bits, if they were set). In addition, when executing code while not logging, the tracking bit logic 108a can mark any modified cache line(s) as not logged (e.g., by clearing their logging bits, if they were set). By clearing tracking bits when not logging in this manner, embodiments further operate to ensure that logging needs only be performed on cache misses. In embodiments, no affirmative behaviors related to tracking bits need occur when transitioning from logging to non-logging.

Figure 3:
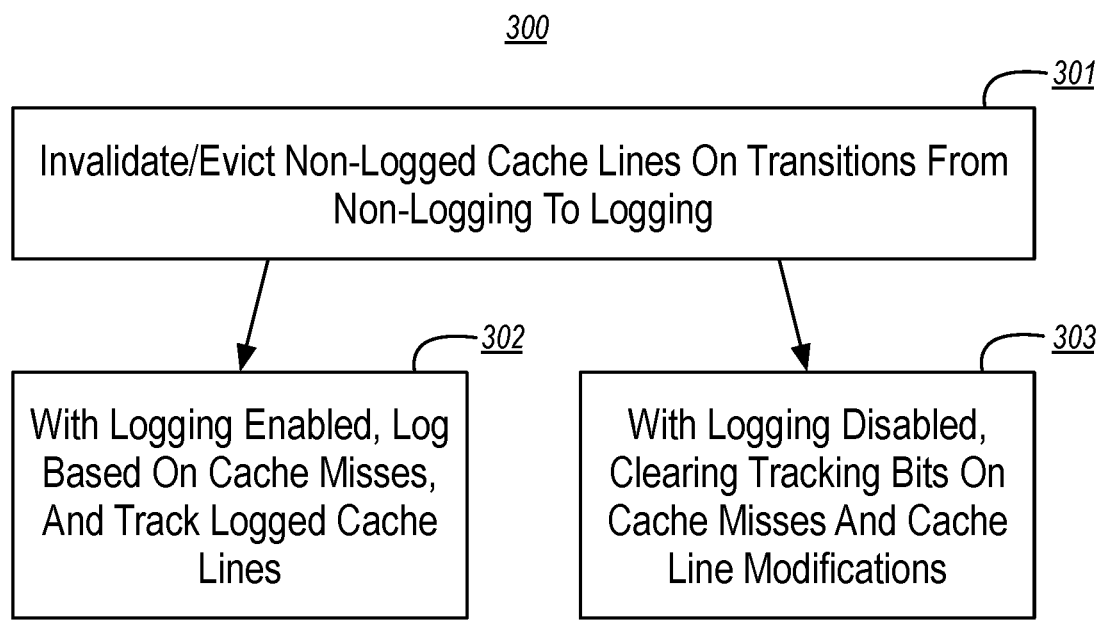
FIG. 3 illustrates a flowchart of an example method for using cache misses to trigger logging to a processor trace, using a cache that uses tracking bits.

In accordance with the foregoing uses of tracking bits, FIG. 3 illustrates a flowchart of an example method 300 for using cache misses to trigger logging to a processor trace. Method 300 might be implemented in hardware environments (e.g., processor(s) 102) that include one or more processing units (e.g., processing unit(s) 105) and one or more caches comprising a plurality of cache lines (e.g., cache(s) 107). In these hardware environments, each cache line might be associated with a tracking bit, such as a tracking bit that is part of the cache line itself (e.g., as in cache 200a), or a bit that is part of a reserved cache line (e.g., as in cache 200b). In implementations, method 300 is implemented, at least in part, using logic defined by processor microcode 108.

As shown in FIG. 3, method 300 includes an act 301 of invalidating/evicting non-logged cache lines on transitions from non-logging to logging. In some implementations, act 301 comprises, based at least on a transition by the one or more processing units from operating in a non-logged context to operating in a logged context, invalidating or evicting one or more of the plurality of cache lines whose tracking bits are not set. For example, a processing unit 105 of processor 102 might transition from operating in a non-logging context to operating in a logging context. Based on this context switch, the invalidation/eviction logic 108c might invalidate or evict cache line(s) in the cache(s) 107 that are tracked as being not logged. This could mean, for example, invalidating or evicting cache lines that have their tracking bit cleared.

A transition from operating in the non-logged context to operating in the logged context could take a variety of forms. For example, operating in the non-logged context could comprise the one or more processing units executing a thread with logging disabled, while operating in the logged context could comprise the one or more processing units executing the thread with logging enabled. Thus, the one or more processing units could transition from operating in the non-logged context to operating in the logged context based at least on a transition from logging being disabled for the thread to logging being enabled for the thread.

In another example, operating in the non-logged context could comprise the one or more processing units operating with logging disabled, while operating in the logged context could comprise the one or more processing units operating with logging enabled. Thus, the one or more processing units could transition from operating in the non-logged context to operating in the logged context based at least on a transition from logging being disabled globally to logging being enabled globally.

In yet another example, operating in the non-logged context could comprise the one or more processing units executing a first thread, while operating in the logged context could comprise the one or more processing units executing a second thread. Thus, the one or more processing units could transition from operating in the non-logged context to operating in the logged context based at least on a transition between threads. In embodiments, this could be, for example, a transition from executing a non-logged first kernel mode thread to a logged second kernel mode thread, a transition from executing a non-logged kernel mode thread to a logged user mode thread, a transition from executing a non-logged first user mode thread to a logged second user mode thread, etc.

Method 300 can also include an act 302 of, with logging enabled, logging based on cache misses, and tracking logged cache lines. In some implementations, act 302 comprises, based at least on the one or more processing units operating in the logged context, initiating logging, to the processor trace, one or more cache lines that store the influxes of one or more cache misses that occur while the one or more processing units operate in the logged context and set the tracking bit for each logged cache line. For example, based on executing machine code instructions of application 104b, a processing unit 105 could trigger a cache miss in the cache(s) 107. A result of this cache miss, a line in the cache(s) 107 could be used to cache one or more memory locations in system memory 103. As part of processing the cache miss, tracking bit logic 108a could set the tracking bit for the cache line, while logging logic 108b could initiate logging of the cache line into the trace(s) 103c.

Method 300 can also include an act 303 of, with logging disabled, clearing tracking bits on cache misses and cache line modifications. In some implementations, act 303 comprises, based at least on the one or more processing units operating in the non-logged context, clearing the tracking bit for one or more cache lines that are replaced by one or more cache misses that occur while the one or more processing units operate in the non-logged context, and/or clearing the tracking bit for one or more cache lines that are modified while the one or more processing units operate in the non-logged context. For example, after a subsequent transition from operating in the logged context to operating in a non-logged context, a processing unit 105 could trigger a cache miss in the cache(s) 107. A result of this cache miss, a line in the cache(s) 107 could be used to cache one or more memory locations in system memory 103. As part of processing the cache miss, tracking bit logic 108a could clear the tracking bit for the cache line. However, since logging is disabled, logging logic 108b might refrain from logging of the cache line into the trace(s) 103c. Notably, in a shared cache, modification of a cache line will typically involve invocation of a CCP, the implementation of which may involve processor microcode. As such, tracking bit logic 108a might be able to be implemented in processor microcode, even when tracking bit changes result cache line modifications rather than cache misses.

While method 300 represents general operation of using cache misses to trigger logging to a processor trace, it may be possible to apply one or more optimizations to method 300 that avoid invalidation/eviction of some cache lines and/or that avoid logging cache lines when that logging may not be needed for a correct trace.

For example, one or more embodiments could include one or more optimizations to act 301 that avoid evicting cache lines that the logged context cannot access—even though those cache lines might have their tracking bits cleared. Thus, for example, the invalidation/eviction logic 108c could be configured to refrain from invalidating or evicting at least one of the plurality of cache lines whose tracking bit is not set, based at least on the logged context lacking access to the cache line. For example, if the logged context is a user-mode thread, that thread typically lacks access to memory that is allocated to kernel mode threads. Thus, for example, act 301 might avoid invalidating/evicting cache lines corresponding to kernel mode memory. In embodiments, these embodiments might rely on permissions specified in one or more page table entries ("PTEs") and/or in one or more TLB entries.

In another example, embodiments could include one or more optimizations to act 302 that avoid logging cache misses relating to PTEs that result from the page tables being traversed in order to populate a processor's TLB to access the actual memory pages. The logging logic 108b can avoid logging of these cache misses by not logging cache misses relating to memory pages for which the logged context lacks access (e.g., as specified in the TLB entries). Thus, for example, if the non-logged context corresponds to a kernel-mode thread and the logged context corresponds to a user-mode thread, then the logging logic 108b could refrain from logging at least one cache line that stores an influx from a cache miss that occurs while the one or more processing units operate in the logged context, based at least on (i) the cache miss corresponding to a page table entry ("PTE"), and (ii) a translation lookaside buffer indicating that the user-mode thread lacks access to the PTE. In these embodiments, the tracking bit logic 108a might ensure that the tracking bits for these cache lines remain cleared.

In yet another example, embodiments could include one or more optimizations that take additional action when page table protection is changed for a logged context. For example, the microcode 108 could detect that a new permission has been granted to a memory page used by the logged context while the one or more processing units are operating in the logged context, and then either invalidate one or more cache lines associated with the memory page (e.g., using invalidation/eviction logic 108c), or clear the tracking bit for the one or more cache lines associated with the memory page (e.g., using tracking bit logic 108a). Additionally, or alternatively, the microcode 108 could detect that a permission has been removed from a memory page used by the logged context while the one or more processing units are operating in the logged context, and then clear the tracking bit for one or more cache lines associated with the memory page (e.g., using tracking bit logic 108a).

As was mentioned in connection with FIG. 1, the one or more portions of the cache(s) 107 might be shared by two or more processing units 105 (e.g., an L2 cache and/or an L3 cache). While a single tracking bit for each cache line can be used to indicate whether or not each cache line in a shared cache has been logged (e.g., by setting the bit to indicate that it has been logged), a plurality of tracking bits for each cache line might be used to additionally indicate the particular processing unit 105 for which the cache line has been logged. In a first example, each tracking bit in a plurality of tracking bits for a given cache line could be assigned to a different processing unit 105. In this first example, a given tracking bit could be set (e.g., to a 1) to indicate that the cache line has been logged on behalf of its assigned processing unit 105. In this first example, multiple tracking bits on a single cache line could be set if the cache line has been logged on behalf of multiple processing units 105. In a second example, a plurality of tracking bits could be used to store an index (e.g., 0, 1, 2, 3, etc.) to a processing unit 105 for which the cache line has been logged. In this second example, the plurality of tracking bits could be set to a reserved value (e.g., "−1") if the cache line has not been logged. Thus, in the context of method 300, any reference to setting or clearing a tracking bit for a cache line could refer to setting or clearing one or more of a plurality of tracking bits for the cache line.

The inventor has observed that additional challenges can arise when using the foregoing techniques with a shared cache. One challenge is ensuring correctness when two (or more) different processing units 105 access the same cache line when one processing unit is operating in a logging mode and the other is not. For example, if a non-logging processing unit causes a cache miss, method 300 might mark the cache line as non-logged (e.g., tracking bit cleared) without logging the cache line. Then, when another logging processing unit later consumes this cache line no cache miss would occur and method 300 might omit logging the cache line—resulting in a potentially incomplete trace.

In order to address these challenges, the inventor has also devised ways to utilize CCPs to ensure trace correctness when tracing in a shared cache scenario. Like the modifications discussed above, these implementations might be implemented entirely (or at least primarily) in microcode, such as microcode defining CCP logic. As mentioned briefly above, processors that possess shared caches (e.g., L2 or L3 caches) operate these caches according to a CCP. In particular, CCPs define how consistency is maintained between data in the shared cache and the backing data store (e.g., system memory or another cache) as various processing units read from and write to data in the shared cache, and how to ensure that the various processing units always read valid data from a given location in the shared cache. CCPs are typically related to and enable a memory model defined by the processor's ISA.

Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in the shared cache. A "modified" cache location contains data that has been modified in the shared cache and is therefore potentially inconsistent with the corresponding data in the backing store (e.g., system memory or another cache). When a location having the "modified" state is evicted from the shared cache, common CCPs require the cache to guarantee that its data is written back the backing store, or that another cache take over this responsibility. A "shared" cache location contains data that is unmodified from the data in the backing store, exists in read-only state, and is shared by the processing unit(s). The shared cache can evict this data without writing it to the backing store. An "invalid" cache location contains no valid data and can be considered empty and usable to store data from cache miss. An "exclusive" cache location contains data that matches the backing store and is used by only a single processing unit. It may be changed to the "shared" state at any time (i.e., in response to a read request) or may be changed to the "modified" state when writing to it. An "owned" cache location is shared by two or more processing units, but one of the processing units has the exclusive right to make changes to it. When that processing makes changes, it directly or indirectly notifies the other processing units—since the notified processing units may need to invalidate or update based on the CCP implementation.

In embodiments, a CCP can be modified to guarantee that there is a cache miss (and, hence, an opportunity for logging by the logging logic 108b) when a logging processing unit accesses a shared cache line that was previously brought into the cache by a non-logging processing unit.

For example, it will be appreciated that, in order for a non-logging processing unit to modify a cache line in a shared cache, that processing unit generally needs to take the cache line in a "modified" or "exclusive" CCP state (or equivalent). Since the processing unit is non-logging, this cache line would typically have its tracking bit(s) cleared (e.g., per act 303). If no other processing unit needs to access a memory location covered by this cache line prior to a transition to logging, the CCP can invalidate or evict the cache line when transitioning to logging (e.g., based on the tracking bit(s) being cleared), ensuring that there is a cache miss if a logging processing unit later accesses a memory location that was covered by the cache line.

If, however, another processing unit does need to use this cache line prior to transitioning to logging, that processing unit generally initiates a CCP request to take that cache line for itself. Some embodiments herein modify the microcode for the CCP so that, during this CCP request, the CCP ensures that a logging processing unit will later initiate a cache miss if it accesses a memory address overlapping with this cache line. For example, if the processing unit that caused the CCP request is logging, the CCP might invalidate or evict the cache line if the cache line is tracked as non-logged (e.g., its tracking bits are cleared), ensuring that the logging processing unit causes a cache miss (and logs the cache miss). If the processing unit that caused the CCP request is non-logging, moving the cache line to a "shared" CCP state (or equivalent) could have the risk of not causing a cache miss if a logging processing unit later accesses it. Thus, the CCP could either (i) invalidate or evict the cache line, or (ii) give the cache line to that non-logging processing unit in an "exclusive" CCP state (or equivalent) and clear its tracking bit(s)—ensuring that the CCP is involved again if a logging processing unit ever needs it.

In view of the foregoing, it will be appreciated that method 300 can operate in situations in which the processing unit(s) 105 include a first processing unit and a second processing unit, and the cache(s) 107 are shared by at least the first processing unit and the second processing unit. In these situations, the processor 102 might use a CCP to manage access to the plurality of cache lines by the first processing unit and the second processing unit. The microcode 108 (e.g., corresponding to the CCP) could be configured to detect that the first processing unit has modified a cache line when operating in the non-logged context. After the first processing unit has modified the cache line, the second processing unit might request access to the cache line, triggering a CCP request. If the second processing unit is logging, this CCP request might invalidate or evict the cache line if its tracking bit is cleared. If the second processing unit is non-logging, this CCP request might invalidate or evict the cache line or give the cache line to the second processing unit in an exclusive CCP state.

The inventor has also devised techniques that utilize way-locking to ensure trace correctness when tracing in a shared cache scenario. These techniques could be used on their own, or in combination with tracking bits. Way-locking is used in connection with associative caches. Since a processor's caches are generally much smaller than system memory (often by several orders of magnitude) there are usually far more memory locations in the system memory than there are lines in the caches. As such, many processors define mechanisms for mapping multiple memory locations of system memory to the cache lines in its caches. Processors generally employ one of two general techniques, direct mapping and associative mapping. Using direct mapping, different memory locations in system memory are mapped to just one line in a given level in the processor's caches, such that each memory location can only be cached into a particular line in that cache level. Using associative mapping, on the other hand, different locations in system memory can be cached to one of multiple lines in a given level of the processor's caches.

Figure 4:
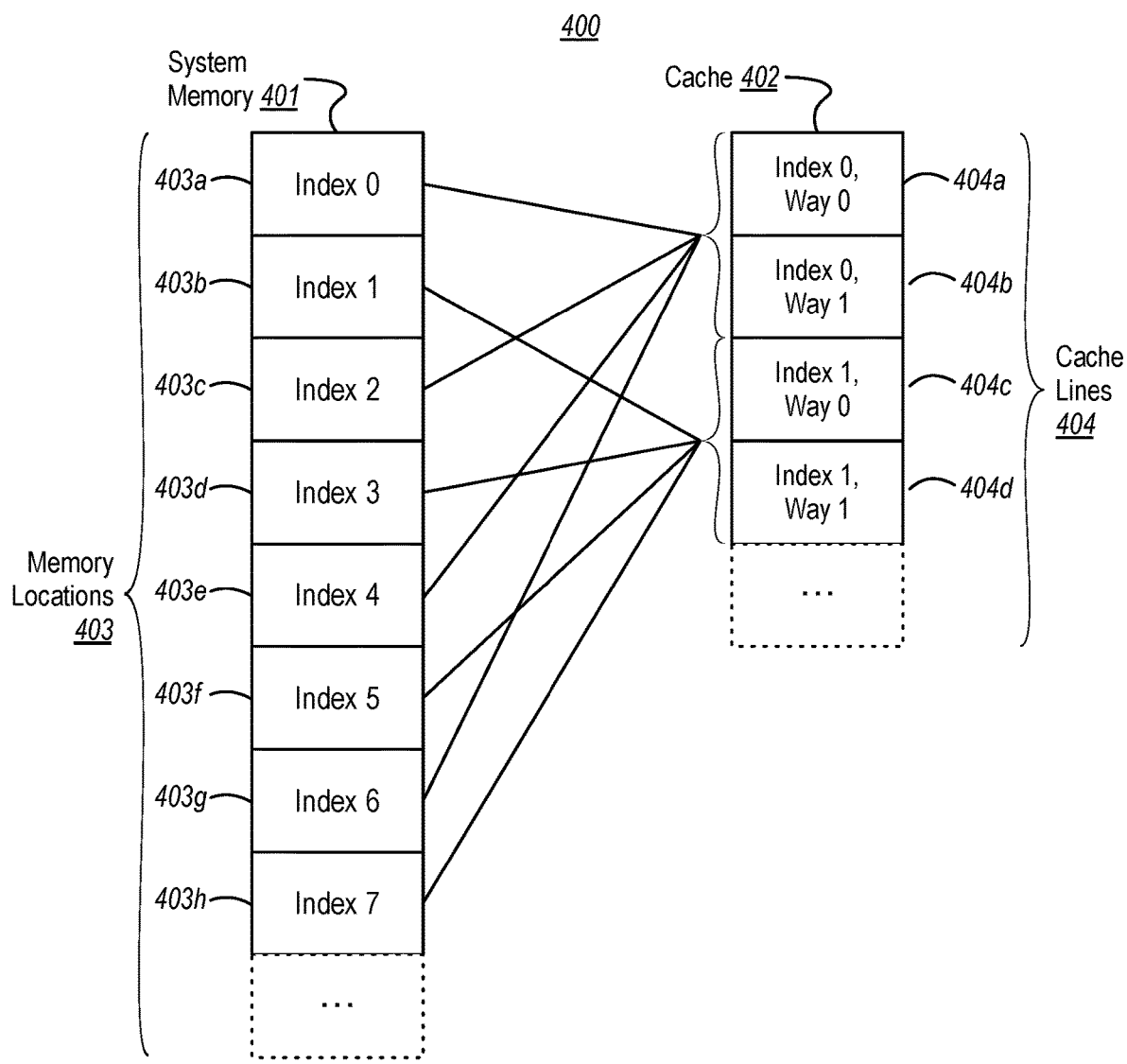
FIG. 4 illustrates an example of associative cache mappings.

FIG. 4 illustrates an example 400 of associative cache mappings. In example 400, cache lines 404 of a cache 402 are logically partitioned into different address groups of two cache lines each, including a first address group of two cache lines 404a and 404b (identified as index 0), and a second address group of two cache lines 404c and 404d (identified as index 1). Each cache line in an address group is associated with a different "way," such that cache line 404a is identified by index 0, way 0, cache line 404b is identified by index 0, way 1, and so on. As further depicted, memory locations 403a, 403c, 403e, and 403g (memory indexes 0, 2, 4, and 6) in system memory 401 are mapped to the address group with index 0. As such, each of these locations in the system memory 401 can be cached to any cache line within the address group with index 0 (i.e., cache lines 404a and 404b). The particular patterns of the depicted mappings in example 400 are for illustrative and conceptual purposes only and should not be interpreted as the only way in which memory indexes can be mapped to cache lines.

Associative caches are generally referred to as being N-way associative caches, where N is the number of "ways" in each address group. Thus, the cache 402 of FIG. 4 could be referred to as a 2-way associative cache. Processors commonly implement N-way caches where N is a power of two (e.g., 2, 4, 8, etc.), with N values of 4 and 8 being commonly chosen (though the embodiments herein are not limited to any particular N-values or subsets of N-values). Notably, a 1-way associative cache is generally equivalent to a direct-mapped cache, since each address group contains only one cache line. Additionally, if N equals the number of lines in the cache, it is referred to as a fully associative cache, since it comprises a single address group containing all lines in the cache. In fully associative caches any memory location can be cached to any line in the cache.

It is noted that FIG. 4 represents a simplified view of system memory and caches, in order to illustrate general principles. For example, while FIG. 4 maps individual memory locations to cache lines, it will be appreciated that each line in a cache generally stores data relating to multiple addressable locations in system memory. Thus, in FIG. 4, each memory location (i.e., 403a-403h) in system memory 401 may actually represent a plurality of addressable memory locations. Additionally, mappings may be between actual physical addresses in the system memory 401 and lines in the cache 402 or may use an intermediary layer of virtual addresses.

Way-locking locks or reserves certain ways in a cache for some purpose. Embodiments herein can utilize way-locking to reserve one or more ways for use by entities that are being logged, such that the locked/reserved ways are used exclusively for storing cache misses relating to execution of logged entities—thereby enabling logging to be performed on those cache misses. For example, referring back to FIG. 4, if "way 0" were locked for a logged processing unit, then cache lines 404a and 404c (i.e., index 0, way 0 and index 1, way 0) would be used exclusively for cache misses relating to execution of that processing unit, and the remaining cache lines would be used for cache misses by non-logged processing units.

As part of locking logged entities to logging ways, embodiments might ensure that logged entities cannot read from cache lines in the non-logged ways (i.e., since the logged entity might read non-logged data if the read access were permitted). Embodiments could ensure that logged entities cannot read from cache lines in the non-logging ways by using the invalidation/eviction logic 108c to flush the non-logging ways on transitions from non-logging to logging, thereby ensuring that logged entities cause cache misses into the logging ways when they access new data. Some implementations might permit read accesses by non-logging entities to the logging ways, since this doesn't affect the logging status of the cache line.

Even with way-locking, some processors might permit non-logged entities (e.g., a kernel mode thread) to write to logging ways (e.g., for a logged user-mode thread). Thus, while flushing the non-logging ways on transitions from non-logging to logging ensures that logged entities cannot read data from the non-logging ways, it might still be possible for there to be non-logged data in the logging ways. In order to ensure correctness in these situations, embodiments might use the CCP to ensure that any cache lines in logging ways that are written to by non-logging entities are invalidated or evicted before a logged entity can read from the cache line. In embodiments, this invalidation/eviction could be performed during a subsequent transition from non-logging to logging. Additionally, or alternatively, in embodiments this invalidation/eviction could be performed by the CCP "on demand" at the time that the logged entity later tries to access the cache line—thereby forcing a cache miss into the logging ways. These written-to cache lines in the logging ways might be identified for invalidation/eviction based on CCP status (e.g., "exclusive" cache lines in a logging way might be candidates for invalidation/eviction).

As an optimization, embodiments might monitor transitions between non-logging and logging, and use tracking bits and way locking only there is a processing unit that is not logging. These embodiments might update the cache lines in the non-logging ways to an exclusive CCP state when more than one processing unit moves to non-logging at the same time.

Figure 5:
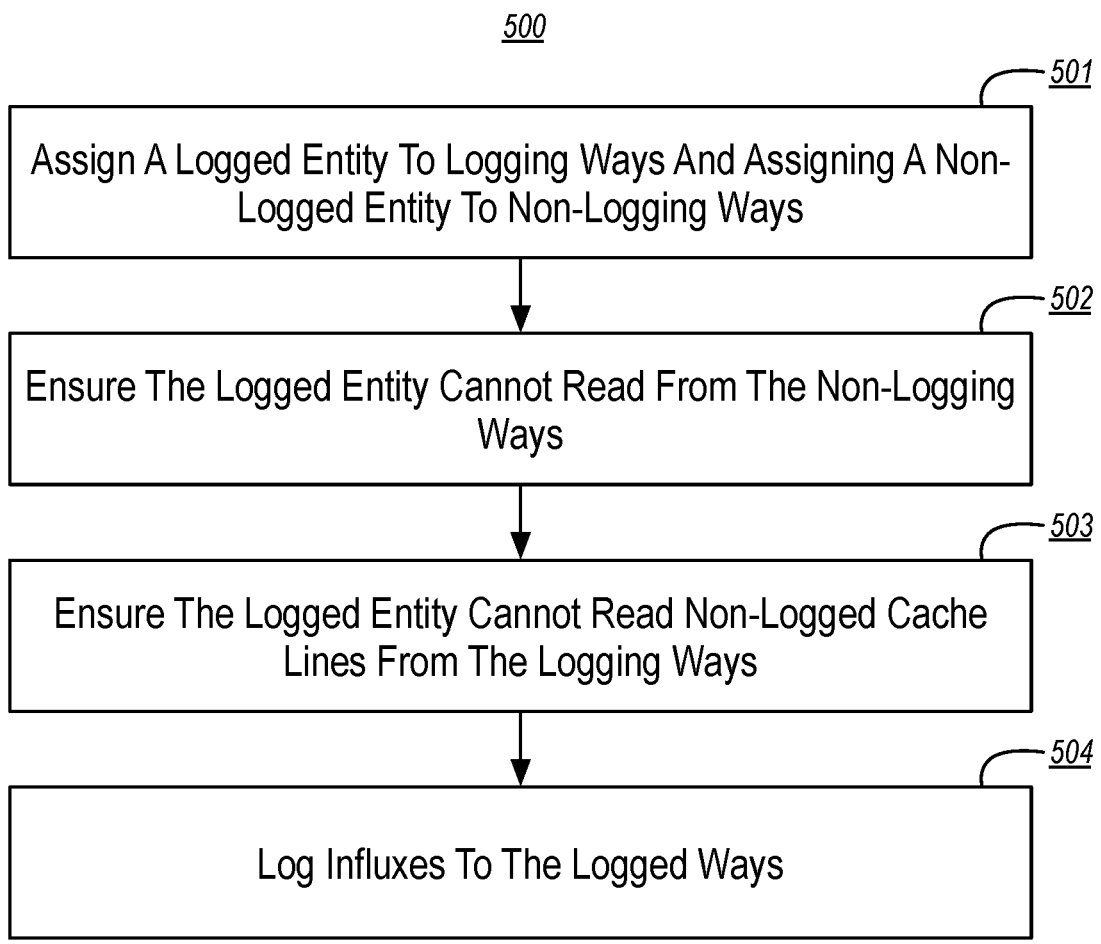
FIG. 5 illustrates a flowchart of an example method for using cache misses to trigger logging to a processor trace, using a cache that uses tracking bits.

In accordance with the foregoing uses of way-locking, FIG. 5 illustrates a flowchart of an example method 500 for using cache misses to trigger logging to a processor trace. Method 500 might be implemented in hardware environments (e.g., processor(s) 102) that include one or more processing units (e.g., processing unit(s) 105) and one or more caches comprising a plurality of cache lines (e.g., cache(s) 107). In these hardware environments, the plurality of cache lines may be divided into a plurality of sets, each set having a plurality of ways (e.g., as described in connection with FIG. 4). In implementations, method 500 is implemented, at least in part, using logic defined by processor microcode 108.

As shown in FIG. 5, method 500 includes an act 501 of assigning a logged entity to logging ways and assigning a non-logged entity to non-logging ways. In some implementations, act 501 comprises assigning one or more first logging ways of the plurality of ways to a logged entity and assigning one or more second non-logging ways of the plurality of ways to a non-logged entity. For example, the microcode 108 might include logic that implements way-locking. This microcode might be used to designate one or more first ways in the cache(s) 107 as logging ways, and one or more second ways in the cache(s) 107 as non-logging ways. The microcode 108 might then assign a logged entity to the first ways and assign a non-logged entity to the second ways. In embodiments, ways might be designated as logging or non-logging based on setting or clearing tracking bits for the cache lines in those ways. Thus, each cache line could include a tracking bit that is used to indicate that the one or more first ways are logged, and that the one or more second ways are not logged.

Method 500 can also include an act 502 of ensuring the logged entity cannot read from the non-logging ways. In some implementations, act 502 comprises ensuring that the logged entity cannot read non-logged cache lines from the one or more second ways. For example, the invalidation/eviction logic 108c might ensure that there are no non-logged cache lines in the second ways that could be read by the logged entity by flushing (e.g., invalidating/evicting) those cache lines on a transition from non-logging to logging. Thus, act 502 could include invalidating or evicting any cache lines in the one or more second ways when there is a transition by the one or more processing units from executing the non-logged entity to executing the logged entity.

Method 500 can also include an act 503 of ensuring the logged entity cannot read non-logged cache lines from the logging ways. In some implementations, act 503 comprises, based at least on a transition from executing the non-logged entity to executing the logged entity, evicting or invalidating any cache lines in the one or more first ways that have an 'exclusive' CCP state. For example, as was discussed, it might be possible that non-logged entities could write to cache lines in the logging ways, resulting in there being non-logged data in the logging ways. As such, the invalidation/eviction logic 108c might invalidate or evict these cache lines before the logged entity reads from them. As was discussed, this invalidation/eviction could be performed by the CCP during a transition from non-logging to logging (e.g., by flushing all "exclusive" cache lines from the logging ways).

Alternatively, this invalidation/eviction could be performed by the CCP on-demand when the logged entity attempts to read from an "exclusive" cache lines in the logging ways. In this embodiment, the invalidation/eviction logic 108c could detect when the non-logged entity is performing a write to a first cache line in the one or more first ways, and to evict or invalidate the cache line before performing the write, causing the write to be performed on a second cache line in the one or more second ways.

Method 500 can also include an act 504 of logging influxes to the logged ways. In some implementations, act 504 comprises, based at least on the one or more processing units executing the logged entity, initiating logging, to the processor trace, any cache lines in the one or more first ways that store the influxes of any cache misses that occur while the one or more processing units execute the logged entity. For example, the logging logic 108b can log any cache misses into the second ways during execution of the logged entity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing device that uses cache misses to trigger logging to a processor trace, comprising:
   one or more processing units;
   a cache comprising a plurality of cache lines, each being associated with a tracking bit; and
   logic that is configured to perform at least the following:
      based at least on a transition by the one or more processing units from operating in a non-logged context to operating in a logged context, invalidate or evict one or more of the plurality of cache lines whose tracking bits are not set, while refraining from invalidating or evicting at least one of the plurality of cache lines whose tracking bit is not set based at least on the logged context lacking access to the cache line; and
      based at least on the one or more processing units operating in the logged context,
         initiate logging, to the processor trace, one or more cache lines that store one or more influxes of one or more cache misses that occur while the one or more processing units operate in the logged context; and
         set the tracking bit for each logged cache line.

2. The computing device as recited in claim 1, wherein the logic is also configured to, based at least on the one or more processing units operating in the non-logged context,
   clear the tracking bit for one or more cache lines that are replaced by one or more cache misses that occur while the one or more processing units operate in the non-logged context; and
   clear the tracking bit for one or more cache lines that are modified while the one or more processing units operate in the non-logged context.

3. The computing device as recited in claim 1, wherein the logic comprises processor microcode.

4. The computing device as recited in claim 1, wherein,
   the one or more processing units operating in the non-logged context comprises the one or more processing units executing a thread with logging disabled,
   the one or more processing units operating in the logged context comprises the one or more processing units executing the thread with logging enabled; and
   the one or more processing units transition from operating in the non-logged context to operating in the logged context based at least on a transition from logging being disabled for the thread to logging being enabled for the thread.

5. The computing device as recited in claim 1, wherein,
   the one or more processing units operating in the non-logged context comprises the one or more processing units operating with logging disabled,
   the one or more processing units operating in the logged context comprises the one or more processing units operating with logging enabled, and
   the one or more processing units transition from operating in the non-logged context to operating in the logged context based at least on a transition from logging being disabled globally to logging being enabled globally.

6. The computing device as recited in claim 1, wherein the one or more processing units operating in the non-logged context comprises the one or more processing units executing a first thread, and wherein the one or more processing units operating in the logged context comprises the one or more processing units executing a second thread.

7. The computing device as recited in claim 6, wherein, the first thread comprises a kernel-mode thread, and the second thread comprises a user-mode thread, and the logic is also configured to refrain from logging at least one cache line that stores an influx from a cache miss that occurs while the one or more processing units operate in the logged context, based at least on (i) the cache miss corresponding to a page table entry (PTE), and (ii) a translation lookaside buffer indicating that the user-mode thread lacks access to the PTE.

8. The computing device as recited in claim 1, wherein the logic is also configured to detect that a new permission has been granted to a memory page used by the logged context while the one or more processing units are operating in the logged context, and to:

invalidate one or more cache lines associated with the memory page; or clear the tracking bit for the one or more cache lines associated with the memory page.

9. The computing device as recited in claim 1, wherein the logic is also configured to detect that a permission has been removed from a memory page used by the logged context while the one or more processing units are operating in the logged context, and to clear the tracking bit for one or more cache lines associated with the memory page.

10. The computing device as recited in claim 1, wherein, the one or more processing units include a first processing unit and a second processing unit, the cache is shared by at least the first processing unit and the second processing unit, and the computing device uses a cache coherency protocol (CCP) to manage access by the first processing unit and the second processing unit to the plurality of cache lines, and the logic is also configured to:

operate the first processing unit in the non-logged context; and while operating the first processing unit in the non-logged context:

detect that the first processing unit has modified a cache line, and after the first processing unit has modified the cache line, detect that the second processing unit has requested access to the cache line, and perform one of:

if the second processing unit is logging, invalidate or evict the cache line if its tracking bit is cleared; or if the second processing unit is non-logging, invalidate or evict the cache line, or give the cache line to the second processing unit in an exclusive CCP state.

11. The computing device as recited in claim 1, wherein the logic is also configured to refrain from logging at least one cache line that stores an influx from a cache miss that occurs while the one or more processing units operate in the logged context, based at least on (i) the cache miss corresponding to a page table entry (PTE), and (ii) a translation lookaside buffer indicating that the user-mode thread lacks access to the PTE.

12. A computing device that uses cache misses to trigger logging to a processor trace, comprising:

one or more processing units;

a cache comprising a plurality of cache lines, the plurality of cache lines being divided into a plurality of sets, each set having a plurality of ways; and logic that is configured to perform at least the following:

assign one or more first logging ways of the plurality of ways to a logged entity, and assign one or more second non-logging ways of the plurality of ways to a non-logged entity;

ensure that the logged entity cannot read non-logged cache lines from the one or more second ways;

based at least on a transition from executing the non-logged entity to executing the logged entity, evict or invalidate any cache lines in the one or more first ways that have an 'exclusive' cache coherency protocol (CCP) state; and based at least on the one or more processing units executing the logged entity, initiate logging, to the processor trace, any cache lines in the one or more first ways that store one or more influxes of any cache misses that occur while the one or more processing units execute the logged entity.

13. The computing device as recited in claim 12, wherein the logic comprises processor microcode.

14. The computing device as recited in claim 12, wherein ensuring that the logged entity cannot read non-logged cache lines from the one or more second ways comprises invalidating or evicting any cache lines in the one or more second ways when there is a transition by the one or more processing units from executing the non-logged entity to executing the logged entity.

15. The computing device as recited in claim 12, wherein ensuring that the logged entity cannot read non-logged cache lines from the one or more second ways comprises causing any read by the logged entity any cache line in the one or more second ways to result in a cache miss to a cache line in the one or more first ways.

16. The computing device as recited in claim 12, wherein the logic is also configured to detect when the non-logged entity is performing a write to a first cache line in the one or more first ways, and to evict or invalidate the cache line before performing the write, causing the write to be performed on a second cache line in the one or more second ways.

17. The computing device as recited in claim 12, wherein each cache line includes a tracking bit that is used to indicate that the one or more first ways are logged, and that the one or more second ways are not logged.

18. A method, implemented at a computing device that includes one or more processing units and a cache comprising a plurality of cache lines, each being associated with a tracking bit, the method for using cache misses to trigger logging to a processor trace, the method comprising:

based at least on a transition by the one or more processing units from operating in a non-logged context to operating in a logged context, invalidating or evicting one or more of the plurality of cache lines whose tracking bits are not set, while refraining from invalidating or evicting at least one of the plurality of cache lines whose tracking bit is not set based at least on the logged context lacking access to the cache line; and based at least on the one or more processing units operating in the logged context, initiating logging, to the processor trace, one or more cache lines that store one or more influxes of one or more cache misses that occur while the one or more processing units operate in the logged context; and setting the tracking bit for each logged cache line.

19. The method as recited in claim 18, further comprising, based at least on the one or more processing units operating in the non-logged context, clearing the tracking bit for one or more cache lines that are replaced by one or more cache misses that occur while the one or more processing units operate in the non-logged context; or clearing the tracking bit for one or more cache lines that are modified while the one or more processing units operate in the non-logged context.

20. The method as recited in claim 18, wherein the one or more processing units operating in the non-logged context comprises the one or more processing units executing a kernel-mode thread, wherein the one or more processing units operating in the logged context comprises the one or more processing units executing a user-mode thread, and wherein the transition by the one or more processing units from operating in the non-logged context to operating in the logged context comprises a context switch from kernel mode to user mode.

\* \* \* \* \*